Jan. 18, 1966   R. H. GLATTHORN ETAL   3,230,344
ARC WELDING APPARATUS AND METHOD OF ARC WELDING
Filed April 29, 1963   5 Sheets-Sheet 1
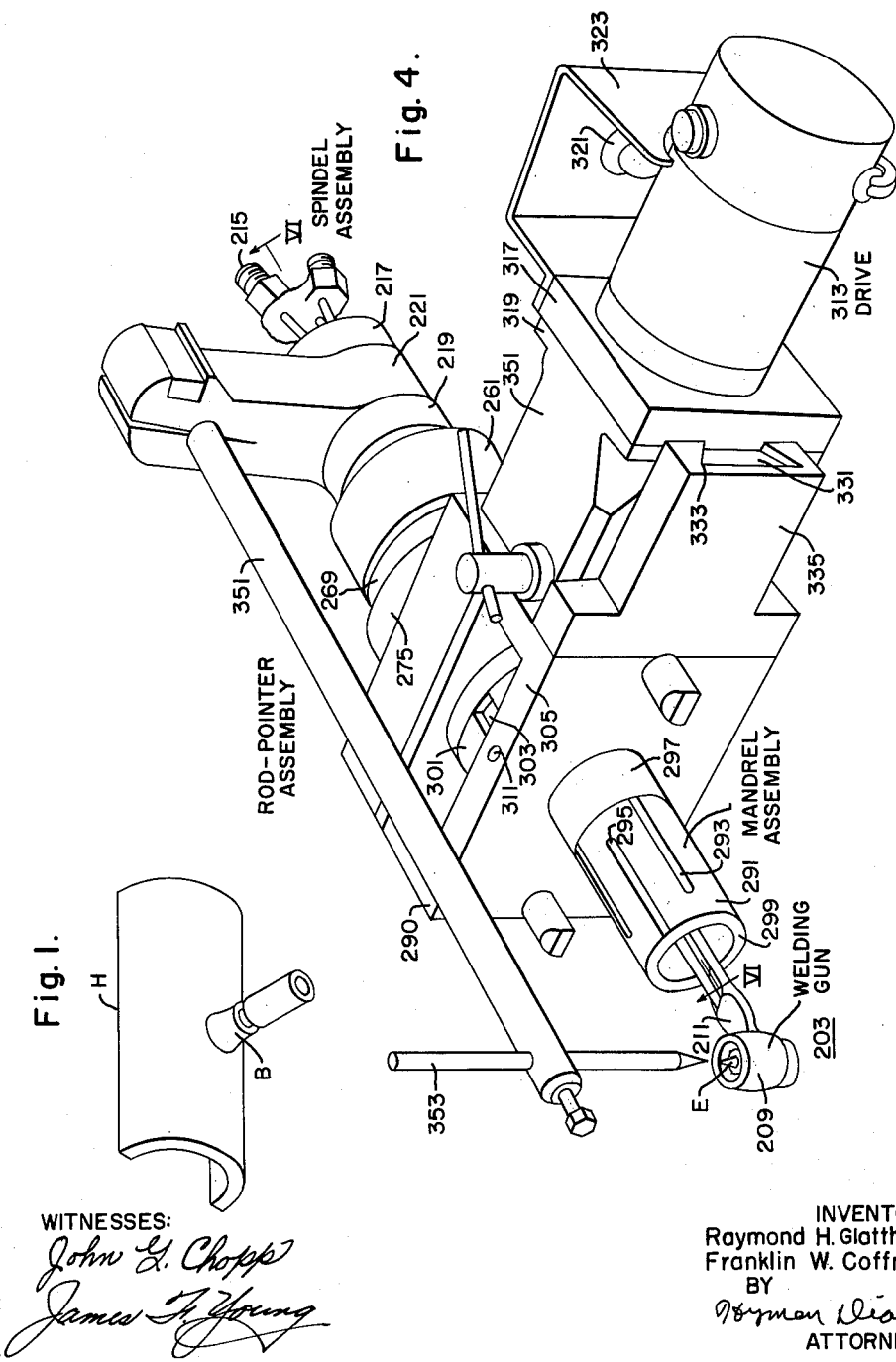
WITNESSES:
John L. Chopp
James F. Young
INVENTOR
Raymond H. Glatthorn and
Franklin W. Coffman
BY
Hyman Diamond
ATTORNEY

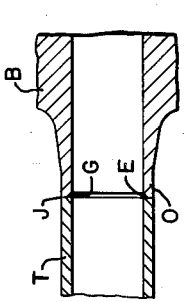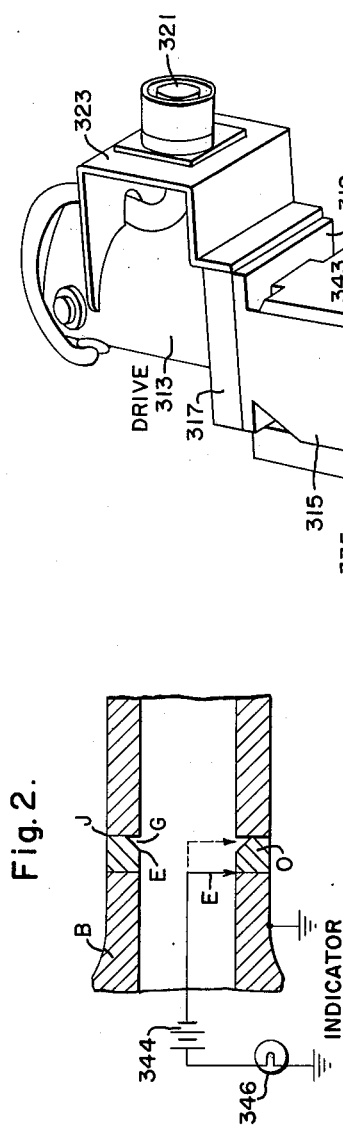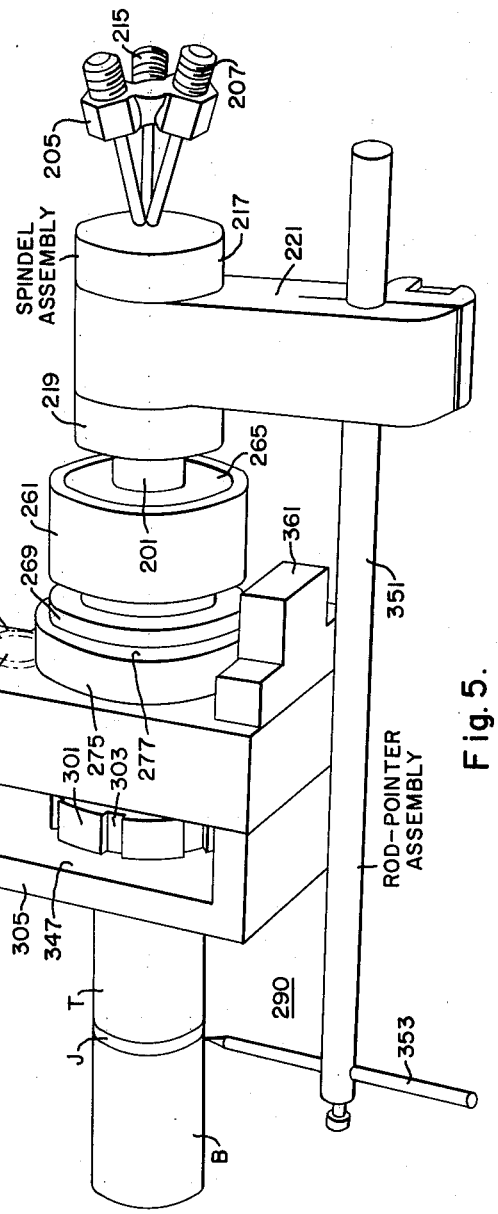

Jan. 18, 1966  R. H. GLATTHORN ETAL  3,230,344
ARC WELDING APPARATUS AND METHOD OF ARC WELDING
Filed April 29, 1963  5 Sheets-Sheet 3

United States Patent Office 3,230,344
Patented Jan. 18, 1966

3,230,344
ARC WELDING APPARATUS AND METHOD
OF ARC WELDING
Raymond H. Glatthorn, Nether Providence Township, Delaware County, and Franklin W. Coffman, Prospect Park, Pa., assignors to Westinghouse Electric Corporation, Pittsburgh, Pa., a corporation of Pennsylvania
Filed Apr. 29, 1963, Ser. No. 276,443
9 Claims. (Cl. 219—137)

This invention relates to arc welding and has particular relationship to the art of producing precision welded joints by arc welding. This application relates to an application Serial No. 276,444, filed concurrently herewith to Raymond H. Glatthorn and Franklin W. Coffman, and assigned to Westinghouse Electric Corporation.

This invention in its specific aspects relates to the fabrication of heat exchangers in which a plurality of tubes are sealed to a header of extended surface area, such as a plate or a cylindrical sector. It is essential that all seals to the tubes be pressure-tight to prevent a leakage of the heat-exchange liquid from the interior of the tubes or the header.

It is an object of this invention to provide such a heat exchanger in which the seals at the joints shall be reliably pressure-tight.

It has been found that to achieve the desired reliability the welded joints to the tubes should have 100% penetration as precisely as such penetration can be achieved, and it is an object of this invention to provide apparatus and a method of welding with which and in the practice of which the 100% penetration shall be reliably achieved.

In the specific practice of this invention the seal is effected at the joint between a boss, which is usually cylindrical, and which extends from a header in the form of a segment of a cylinder and an enclosure, usually a tube, which is to be joined to the boss. The boss and the tube are of substantial thickness. In accordance with this invention the desired precise penetration is achieved by welding the joint both internally of the tubular member and externally. Preferably, the joint is welded internally first and then externally. It has been found in practicing this invention that the internal weld which is first produced tends to deform the external weld. It is one aspect of this invention that the deformation of the external portion of the joint is determined after the joint is welded internally and corrections are effected in the welding of the external joint.

In the preferred practice of this invention, the welding, both of the internal and of the external region of the joint, is carried out with a non-consumable electrode. An arc is fired between the joint and the electrode and is moved, or rotated, around the joint by moving the electrode to fuse the joint. The arc is shielded preferably in an inert-gas atmosphere while it is rotated. It has been discovered that in welding the internal region of the joint the external region of the joint becomes excessively hot and would tend to oxidize unless protected; likewise, in welding the external region of the joint, the internal region becomes hot and would oxidize unless protected. In accordance with a further aspect of this invention each region of the joint is purged or shielded in an atmosphere of inert gas while the opposite region is being welded; that is, the external region of the joint is purged or shielded during the welding of the internal region of the joint and the internal region is purged while welding the external region.

To practice the above-described method it is necessary that welding apparatus for welding the joint internally and externally of the tubular member be provided. The apparatus for welding the tubular joint externally is disclosed in the above-entitled application Serial No. 276,444.

It is an object of this invention to provide apparatus for welding a joint between a tubular member and another member internally.

In accordance with this aspect of this invention welding apparatus is provided which includes a mandrel assembly having a mandrel, or lock tube, adapted to be centered in the enclosure abutting the boss. The mandrel assembly supports a spindle which carries a welding gun with an electrode of the non-consumable type. For transmitting shielding gas to the arc and for cooling the electrode, the gun is in accordance with a specific aspect of this invention suspended from a plurality of tubes. One of the tubes is bent into a hairpin with the gun suspended from the apex of the hairpin. The gun and electrode are connected to the apex through a material of a high thermal conductivity and is thus in heat interchange relationship with the apex. A cooling fluid, usually water, flows to the gun through one arm of the hairpin and away from the gun through the other. The other tube which supplies shielding gas is in communication with the tube in which the electrode is supported and supplied a protective gas to the arc.

In the use of this apparatus the electrode is positioned opposite the joint internally of the tubular member. To achieve the desired precision, it is essential that the tip of the electrode be spaced a precise distance from the joint. In accordance with another aspect of this invention, an electrical indicator is provided for the purpose of setting the axial and the radial position of the electrode. This indicator includes a lamp or other indicating means connected in series with a power supply, for example, a battery of low wattage, the electrode and ground. The enclosure abutting the joint is also grounded. Contact between the electrode and the internal surface of the tubular member is indicated by the energization of the lamp. Once the existence of contact is established, the spacing of the electrode from the joint may be set with a gauge.

In the preferred practice of this invention, the joint between the enclosure and the abutting member which is to be welded has a small indentation. The position of the joint may be determined with the aid of the indicator by causing the electrode to engage the surface of the enclosure or of the abutting member on one side or the other of the joint. This engagement is indicated by the lamp. The electrode may then be moved axially towards the joint. When the electrode reaches the joint the lamp is deenergized. The radial position of the electrode tip at this point is known, the electrode may then be set inwardly from the joint the desired distance with the aid of a gauge.

It has been found in the practice of this invention that it is necessary that a chill collar be provided about the external region of the joint to reduce the heat developed in this region by the welding of the internal region of the joint. In accordance with the preferred practice of this invention the protective atmosphere for shielding the external region of the joint is transmitted through this chill collar.

The novel features considered characteristic of this invention are disclosed generally above. For a better understanding of this invention, both as to its organization and as to its method of operation, together with is made to the following description of a specific embodiment taken in connection with the accompanying drawings, in which:

FIGURE 1 is a view in perspective showing typical parts to be joined;

FIG. 2 is a view in longitudinal section showing the parts to be joined in the region of the joint and diagrammatically showing the relationship of the electrode and the indicating apparatus to the parts to be joined;

FIG. 3 is a view in longitudinal section showing the dimensions of the parts to be joined in a typical situation;

FIG. 4 is a view in perspective showing welding apparatus in accordance with this invention for producing an internal joint;

FIG. 5 is a view in perspective showing welding apparatus in accordance with this invention mounted in the tubular member in welding relationship to a joint;

The parts to be welded, shown in FIGS. 1 through 3, include a header H generally in the form of a segment of the cylinder from which a plurality of hollow cylindrical bosses B extend, only one of these bosses is shown. A tube T is to be welded pressure-tight to each of the bosses B at the joint J.

In the practice of this invention a precision weld of the tube T and the boss B is produced. In actual practice a number of such joints have been made and have been found to transmit heat-exchange fluid without leakage through the joint. In a typical situation the parts to be welded are composed of Monel metal which is an alloy of nickel and copper. The boss B is preferably provided with an overlay O of a nickel-copper alloy including substantial deoxidizer to assure the soundness of the weld. The welding is effected by firing an arc between a non-consumable electrode E and the joint J internally of the tube T. The arc is shielded in a protective atmosphere and thus shielded is rotated around the joint, fusing the joint.

The apparatus in accordance with this invention for producing the weld includes a Spindle Assembly, a Welding Gun suspended from the assembly, a Mandrel Assembly, a Drive and an Indicator for setting the electrode E precisely in welding relationship with the joint J. For repairing unsatisfatcory welds the apparatus also includes a Rod-Pointer Assembly for properly setting the electrode E in relationship to the joint to be repaired.

Figures 14, 15:
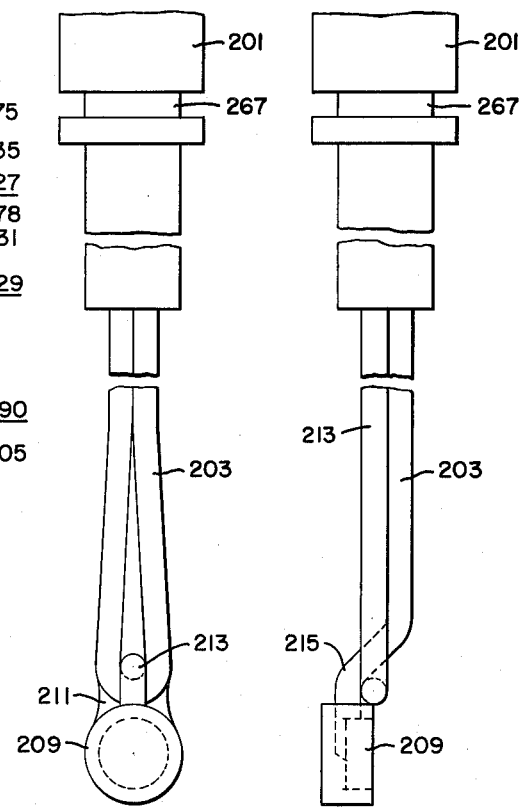
FIG. 14 is a view in top elevation of the spindle of the apparatus in accordance with this invention.
FIG. 15 is a view in side elevation of this spindle.
Figure 9:
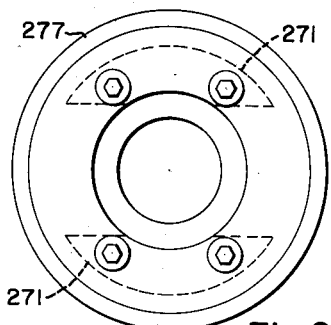
FIG. 9 is a fragmental view in end elevation showing this mechanism.
Figure 8:
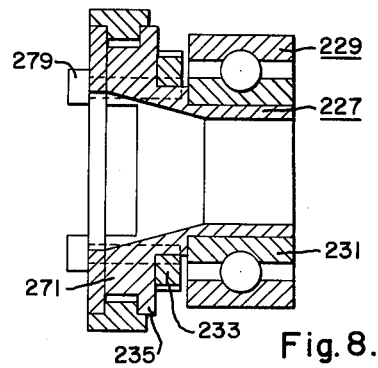
FIG. 8 is a fragmental view in section showing the mechanism for moving the electrode radially and its associated parts.
Figure 10:
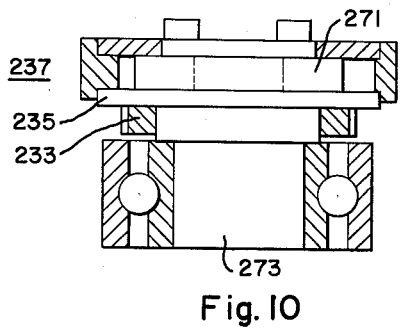
FIG. 10 is a fragmental view in side elevation showing this mechanism.

The Spindle Assembly includes a shouldered elongated tube or shaft 201 to which the suspension for the Gun is secured. This suspension includes a tube 203 (FIGS. 14, 15) bent into a hairpin and connected at its ends to fittings 205 and 207. The cooling liquid flows into one arm of this tube 203 and out through the other arm of this tube. The Gun is connected in heat exchange relationship to the apex of the tubes 203. Preferably, the enclosing cylinder 209 of the Gun may be soldered with silver solder 211 in adequate quantities to the apex of the hairpin 203 (FIG. 14). The suspension for the Gun also includes another tube 213 which is in communication with the cylinder 209 of the Gun encircling the electrode E and the collet (not shown) and which is connected to a fitting for transmitting protective gas. This tube 213 terminates in a fitting 215 through which the gas is injected.

The tube assembly 203–213 from which the Gun is suspended is brazed into the shaft 201 at the end remote from the Gun. To improve thermal conduction, the tubes 203 and 213 are brazed substantially along their whole length.

A pair of sleeves 217 and 219 are secured to the shaft 201 near the end remote from the Gun. Between the sleeves 217 and 219 the clamping bracket 221 for the Rod-Pointer Assembly are mounted. The shaft 201 is rotatable relative to the bracket 221.

The Spindle Assembly also includes a flanged bushing 223 which is keyed to the shaft 201. The stem 225 of the bushing is threaded on the outside. The bushing extends through a flanged bushing housing 227. The bushing 223 is slidable horizontally relative to the housing 227 but is rotatable therewith. The bushing housing 227 is rotatable in a ball bearing 229, the movable race 231 of which is secured externally to the housing. The housing 227 is driven through a gear 233 secured to its flange 235.

Figure 12:
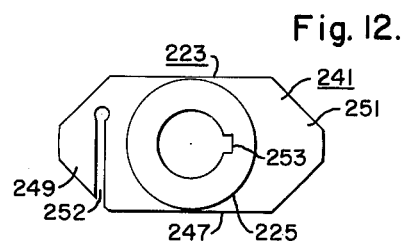
FIG. 12 is a view in end elevation of this housing.

The bushing 223 has a flange 241 which extends centrally between the stem 225 and a hollow cylindrical portion 243 of smaller diameter connected to the flange by a tapered portion 245. The flange 241 has opposite plane sides 247 (FIG. 12) generally tangent to the outer surface of the stem 225. These plane sides 247 terminate in generally truncated triangular ends 249 and 251. One of these triangular ends 249 carries a slot 252 lending the flange 241 resilience so that it may be slightly deformed.

The stem 225 has an elongated keyway 253 on one side. The shaft 201 also has a keyway 255 extending along one side from its shoulder. The bushing 223 and the shaft 201 are locked against relative rotation by a key 257 which engages the keyway 255 in the shaft 201 and the adjacent portion of the keyway 253 in the stem 225. This key 257 while preventing relative rotation of the bushing 223 and the shaft 201 but permits the shaft 201 and the Gun supporting assembly 203–213 to move longitudinally relative to the bushing thus permitting the adjustment of the axial position of the Gun.

The axial displacement of the shaft 201 and Gun is attained by rotating a knurled knob 261 which in turn rotates an internally threaded ring 263, the thread of which is in engagement with the thread on the stem 225. The shaft 201 is interlocked with the ring 263 by a split ring 265 which is secured to the ring 263 and engages a neck 267 on the shaft 201. The shaft may be locked in any vertical position by a lock nut 269.

The flange 235 of the bushing housing 227 has opposite projections 271 extending outwardly from the flange. The stem 278 of the housing 227 is internally tapered to accommodate the corresponding tapered portion 245 of the bushing 223. The bushing 223 extends into the housing 227 with the tubular part 243 and the tapered part 245 along the stem 278 of the housing and the plane sides 247 slidable along the projections 271.

Figure 13:
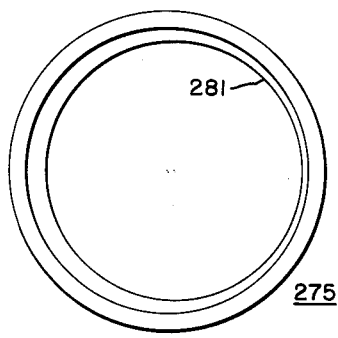
FIG. 13 is a view in end elevation of the ring which produces the radial displacement.
Figure 11:
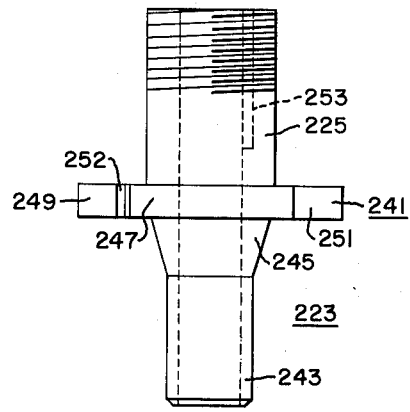
FIG. 11 is a view in side elevation of the bushing housing which cooperates in the radial positioning of the electrode.

An offset ring 275 is secured between the flange 235 of the bushing housing 227 and a holding ring 277 which is bolted to the flange 235 by bolts 279 extending through the projections 271. The offset ring 275 (FIG. 13) has an eccentric inner periphery 281 which engages the truncated ends 249 and 251 of the flange 241 of the bushing 223. As the offset ring is rotated, this flange 241 is moved transversely to the axis of the Spindle Assembly displacing the shaft 201 and the Gun and electrode E transversely with reference to the tubular member T. The slot 252 permits the flange 241 to be compressed or released.

The bushing 223 and the shaft 201 and the tubular assembly 203–213 suspending the Gun are movable laterally relative to the bushing housing 227 by rotation of the offset ring 275. The whole Spindle Assembly including the bushing housing 227, the offset ring 281, the shaft 201 and the tubular assembly and Gun are rotated together when the gear 233 is driven.

The Mandrel Assembly is suspended from the housing 290 which supports the Drive and includes a lock tube 291 and a lock shaft or expander shaft 293 or an expander for the lock tube. The lock tube 291 is a generally cylindrical metal tube having axial slots 295 extending inwardly from both ends. The lock tube 291 is tapered at both ends. At one end the lock tube 291 engages a tapered tip on a stem 297 extending from the housing 290 for the Drive. At the other end the lock tube 291 engages at its tapered tip the externally tapered end 299 of the lock shaft or expander shaft 391. The lock tube 291 is held between the tapered tip of the stem 297 and the tapered end 299 of the expander shaft 293.

Figure 6:
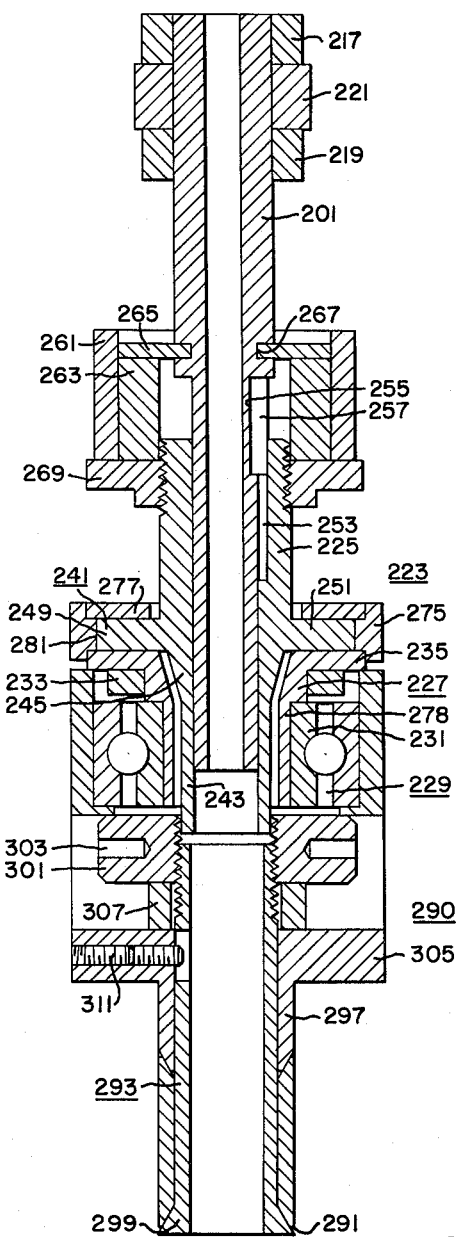
FIG. 6 is a view in longitudinal section taken along the line VI—VI of FIG. 4 with the spindle removed.

The expander shaft 293 is generally cylindrical having the taper at the end 299 and being threaded at the opposite end. The thread is engaged by an adjusting ring 301 provided with slots 303 so that it may be readily rotated. The ring 301 is separated from the lower side 305 of the housing 290 for the Drive by a spacer 307. Rotation of the ring 301 clockwise as viewed from the side of the lock tube 291 (below FIG. 6) moves the tapered tip 299 of the expander shaft 293 into the lock tube 291 expanding the lock tube.

In the use of the apparatus the lock tube 291 is inserted in the tubular member T to be welded and the ring 301 is rotated in the clockwise direction as described to expand the lock tube 291 so that the Mandrel Assembly is securely locked to the tubular member. The expander shaft 293 is prevented from rotating with the ring 301 by set screws 311 which are inserted through the lower side 305 of the housing 290.

The Drive includes a motor 313 and a speed-reducer gear box 315. The motor 313 and the gear box may be conventional and may be purchased from J. M. Schmidt Precision Tool Company. The motor 313 is suspended from the gear box 315 and extends into the gear box through a rectangular yoke 317 which is secured to a flange 319 extending from the gear box 315 and aids in supporting the motor. Power is supplied to the motor through a connector 321 which is mounted on a bracket 323 suspended over the motor from the rectangular yoke 317. The gear box 315 is provided with a male dovetail 331 which slidably engages a female dovetail 333 in a plate 335 suspended from the lower part of the housing or frame 290.

The low speed shaft 341 of the gear box 315 carries a pinion 343. This pinion drives an idler gear 345 supported in bearing (not shown) in the housing 290. This idler gear 345 engages the gear 233 on the busing housing 225 of the Spindle Assembly rotating the Assembly.

The housing or frame 290 from which the Drive is suspended is of generally rectangular form having an opening 347 on one side through which the ring 301 for expanding the lock tube 291 may be operated and having the suitable grooves 349 in the top through which the Spindle Assembly is driven. Within the gear box 315 there is a spring (not shown) which urges the pinion into engagement with the idler gear 345 so that the drive is positive.

The Indicator includes a power supply such as a low-power battery 344 and a lamp 346. The lamp 346 and power-supply 344 are connected between ground and the Electrode E. The tubular member T is in the use of the apparatus also grounded. So that the Indicator may serve its purpose the overlay O is provided at its end with a bevel V (FIGS. 2, 3) which when the boss B and the tube T are abutted provides a groove G. The groove G enables interruption of the Indicator circuit which may have been completed through a wall of the tube T or boss B.

In setting the apparatus for a welding operation the electrode E may be engaged with the inner surface of the tubular member T to one side of the joint J being welded. At this point the circuit through the battery 244 and the lamp 246 is completed so that the lamp indicates the contact between the electrode and the tubular member. The operator may then move the Spindle Assembly axially until the electrode is opposite the groove G. At this point the Indicator circuit is opened and the lamp 346 is extenguished. The operator then knows that he is opposite the joint. The operator may then set the distance between the electrode and the joint by rotating the offset ring 275. So that the operator may properly position the electrode E a scale may be provided for use in conjunction with the offset ring 275.

The Rod-Pointer Assembly includes in addition to the clamping bracket 221 a rod 351 and a pointer 353 suspended from the rod 351. The Spindle Assembly is rotatable relative to the bracket 221 but the bracket is movable axially with the Spindle Assembly.

The rod 351 is a solid rod of metal and the pointer 353 is a pin of metal having a point at the end. The rod is adjustable secured movable with the bracket 221 and the pointer is secured to the end of the rod 351. The rod 351 may be set so that the tip of the electrode E is directly opposite to the point of the pointer and the line between the tip of the electrode and the point of the pointer 353 is generally parallel to the plane of the joint which is being welded. Once the rod 351 and pointer 353 are so set, the position along the tubular member T of the pointer is in the same plane intersecting the tubular member as the tip of the electrode E. By noting the position of the pointer the operator may then know the position of the electrode.

The Rod-Pointer Assembly is used to set the position of the electrode E in situations where repair of the internal weld in the joint J is required. Once the internal weld has been completed the groove G which permits use of the electrical Indicator is eliminated and the latter cannot be used. In the use of Rod-Pointer Assembly the electrode is engaged with the internal surface of the tubular member T and is then moved axially until the pointer 253 is opposite the joint J. The operator then knows that the electrode is opposite the joint. The operator may then set the distance between the electrode E and the joint J to be repaired with the aid of a gauge (not shown) suspended from a bracket 361 secured to the top of the frame or housing 290.

Typically, the welding is carried out between a boss B from header H having the form of a segment of a cylinder and a tubular member T as shown in FIG. 1. The tubular member T and the header H and the boss B are composed of Monel metal, but the boss has an overlay having a thickness of about one-quarter inch of Monel metal including deoxidizer components.

Typical alloy content of the tubular member T and header base metal which is welded in the practice of this invention is as follows:

| | Percent |
|---|---|
| Nickel | 66 |
| Carbon | 0.12 |
| Manganese | 0.90 |
| Iron | 1.35 |
| Sulfur | 0.005 |
| Silicon | 0.15 |

Remainder copper.

The cladding on the boss is provided by arc welding with a filler wire which has the same composition as above except that it has aluminum 1.25%, titanium at least 1.50% and as high as 3%. Copper is reduced correspondingly to the addition of aluminum and titanium.

The welding is carried out first internally and then externally with the boss B and the tubular member T in the horizontal position and the joint J generally verical. The welding operation is semi-automatic. The electrode is set in welding position by the operator and after it is properly set the operator actuates a push button on a sequence timer (not shown) and the weld is produced. The sequence timer may be similar to, or patterned after, the timer disclosed in Patent 3,118,051 granted January 14, 1964 to Austin Dixon and assigned to Westinghouse Electric Corporation.

The power supply for the welding arc may preferably be a direct-current power supply of the rectifier type. The apparatus includes a high frequency stabilizer (not shown) which is preferably operated only during the firing of the arc. Provisions are also included for reducing the arc current to taper off the weld. The electrode is of the non-consumable type. A 2% thoriated tungsten electrode of 3/32 inch diameter is suitable.

Figure 7:
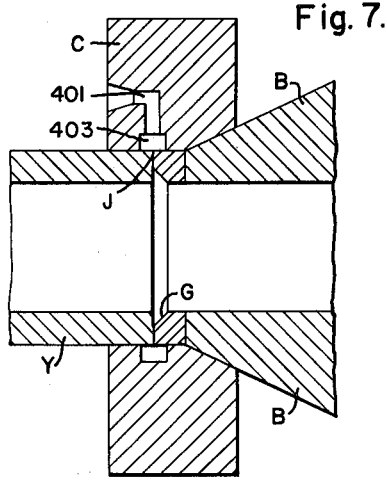
FIG. 7 is a view in longitudinal section showing portions of the members to be joined near the joint and the chill collar which is used in the welding operation.

In producing an internal weld a chilling collar C (FIG. 7) is mounted on the outside of the boss B and tube T adjacent the joint J. The collar C may be in the form of a ring tapered internally at one end to engage a taper in the boss B. The collar C includes a channel 401 connected to a ring-shaped groove 403 around the joint J. Purging gas may be transmited through the channel 401 around the groove 403. The faces of the collar C which contact the boss B and the tube T are in chilling relationship to these parts. For ease in mounting, the collar C may be provided in sequential sections.

The following procedure is followed in producing the internal weld:

(1) The header H and the tube T are positioned for welding in a jig so that the boss B and the tubular member T are horizontal.

(2) Preferably, a vented plug is inserted at the open end of the boss B preferably at least one or two inches from the joint J. This plug reduces the access of atmospheric air to the joint.

(3) The chilling collar C (FIG. 7) is mounted on the boss B and tubular member T outside of the joint J.

(4) The outside of the joint J is purged with commercial argon (99.8% purity) flowing at the rate of about five cubic feet per hour through the chill collar C for a time interval of about six seconds.

(5) The lock tube 291 of the Mandrel Assembly is inserted in the tubular member and is expanded to secure the Mandrel Assembly to the tubular member T.

(6) The electrode is set at the nine o'clock position as viewed from the header to the tubular member.

(7) The arc gap is set about .040 inch with the aid of the indicator I, the D is set for a rotation of speed of one revolution per minute in a counterclockwise direction as viewed from the header to the tube.

(8) The power supply is connected for welding at straight polarity and the power supply and the sequence time are set for the following parameters:

| | |
|---|---|
| The weld time | 48 seconds. |
| The taper time following the welding (usually after the welding electrode has passed through 360 to 400°) | 10 seconds. |
| Prepurge time | 6 seconds. |
| Current | 108 to 112 amperes. |
| Arc voltage | 10 to 12 volts. |
| The shielding gas | 10 cubic feet per hour of helium and 5 cubic feet per hour argon. |

(9) The start button on the sequence timer (not shown) is pressed and the following operation is automatically carried out:
 (a) Prepurge.
 (b) start of rotation followed by the welding cycle.
 (c) Reduction of the arc current to taper off the current following the completion of the rotation of Gun through 360°.
 (d) Postpurge of the weld five seconds.
 (e) Interruption of the supply of welding current.

(10) The weld is then allowed to cool to about 150° F.

(11) The welding electrode is then set at the three o'clock position as viewed from the header to the tube.

(12) The Drive is then adjusted for rotating the electrode at a speed of about one revolution per minute in the clockwise direction.

(13) Of the parameters listed under (7) only the weld time is changed; it is increased from 48 seconds to 62 seconds.

(14) The start button is pressed to repeat the sequence of operations listed under paragraph (8).

The welded parts are removed and the internal weld is then carefully inspected and the condition of the joint externally is viewed. If the joint J in the region of the weld has become deformed, for example, because of the action of gravity on the softened material near the joint J, arrangements can be made to invert the header H and tubular member T so that the deformed portion is 180° displaced from its original position. Other deformations may be corrected by properly setting the length of the arc or by properly changing the parameters.

Before producing the external weld it is necessary to make sure that the joint has cooled to 150° F. or lower.

Figure 16:
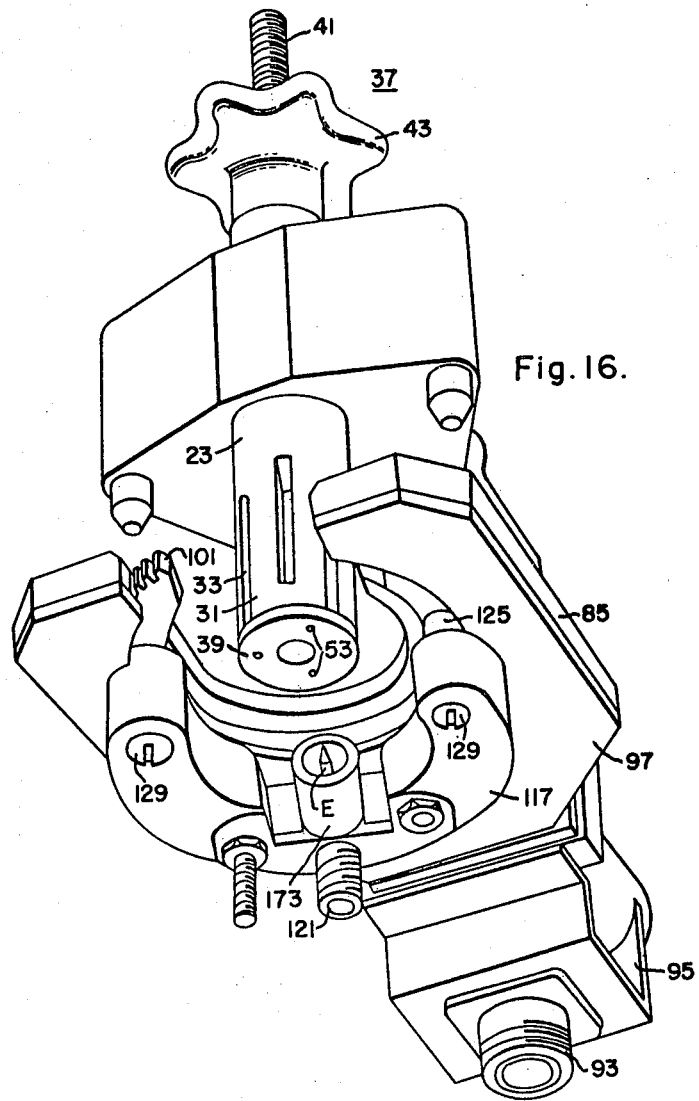
FIG. 16 is a view in perspective identical to FIG. 2 of application Serial No. 276,444, showing apparatus for welding the external region of the joint.

The apparatus for producing the external weld is shown in FIG. 16. The apparatus is described in detail in application Serial No. 276,444.

The following procedure is followed in producing the external weld:

(1) The header H and the tubular member T are placed in a positioning jig with the boss 3 and the tubular member T horizontal. The parts may be inverted with reference to their position during the internal welding if such inversion is required by deformation by reason of gravity.

(2) A vented plug is placed in the end of the boss remote from the point in which the Mandrel Assembly is to be inserted.

(3) The lock tube 33 of the external welding apparatus is inserted in the tubular member T and is locked securely into the tubular member.

(4) The electrode E of the external welding Gun is set at the twelve o'clock position as viewed from the header H to the tubular member T.

(5) The Drive of the external welding apparatus is set for a speed of one revolution per thirty seconds in a counterclockwise direction.

(6) The internal region of the joint J is prepurged with argon (or other inert gas) flowing at the rate of five cubic feet per hour until the gas in this region has an oxygen content of less than 1%.

(7) The power supply unit is set for straight polarity and the power supply and the sequence timer are set for the following parameters:

| | |
|---|---|
| Weld time | 36 seconds. |
| Taper time | 10 seconds. |
| Prepurge time | 6 seconds. |
| Current | 98 to 102 amperes. |
| Arc voltage | 10 to 11 volts. |
| Shielding gas | 10 cubic feet per hour helium and 5 cubic feet per hour argon. |

(8) The start button of the sequence timer is pressed and the welding sequence of operation similar to the sequence under paragraph 9 for the internal weld is carried out.

The seal thus made should be carefully examined for soundness. Principally, the following procedure should be followed:

(1) All scale and discoloration should be removed by brushing with a stainless-steel wire brush.
(2) The welds should be visually inspected.
(3) The welds should be inspected with a dye penetrant.
(4) Radiographs should be produced. If inspection shows deflects these may be corrected and in the case of correction of the internal welds the Rod-Pointer Assembly may be used to position the welding electrode E.

While a preferred embodiment of this invention has been disclosed herein, many modifications thereof are feasible. This invention then is not to be restricted except insofar as is necessitated by the spirit of the prior art.

We claim as our invention:

1. In the arc welding with an electrode of a joint between abutting members from a side of said members not visible to the welding operator, said joint prior to being welded having a notch penetrating below the surface on said side of at least one of said members, the method of setting said electrode in welding relationship to said joint which comprises setting said electrode in contact with the surface of said one member adjacent said notch to close an electrical circuit including said electrode, said one member and an indicator indicating that said circuit is closed, moving said electrode in contact with said surface towards said notch until said indicator indicates that said circuit be opened, and thereafter moving said electrode away from said notch to the distance corresponding to the desired length of the welding arc.

2. Apparatus for arc welding an internal joint between a tubular member and an abutting member including mandrel means including a mandrel to be engaged with, and secured to, said tubular member, a hollow spindle passing through said mandrel and rotatably suspended from said mandrel means, tubes for transmitting cooling fluid and a tube for transmitting protective gas passing through said spindle and mounted rotatable therewith, and a welding gun having a welding electrode secured to the ends of said tubes passing through said spindle in heat interchange relationship with said tubes for transmitting cooling fluid and connected to said tube for transmitting gas to transmit the gas to shield an arc between said electrode and said joint.

3. Arc-welding apparatus for welding a joint extending generally in one plane internally of a hollow member comprising, a welding electrode, first suspending means for suspending said electrode within said member, a pointer, and second suspending means connected to said first suspending means for suspending said pointer externally of said member with its point oppositely to the tip of said electrode with the line between said points generally parallel to the plane of said joint.

4. The method of producing by arc welding with an arc-welding electrode a precision weld having substantially 100% penetration between work materials abutting at a joint, one side of said joint being visible to the welding operator and the opposite side of said joint being invisible to said operator, the said method comprising, with the aid of an indicator setting said electrode in precision-welding relationship with said opposite side of said joint, producing a first weld with said electrode from said opposite side, said first weld having a predetermined penetration less than 100%, and after said first weld is produced as aforesaid producing a second weld by arc welding from said one side, said second weld penetrating to the root of said first weld.

5. The method of producing by arc welding with a welding electrode, a precision weld having substantially 100% penetration between work materials abutting at a joint, one side of said joint being visible to the welding operator and the opposite side of said joint being invisible to said operator, the said method comprising, with the aid of an indicator setting the welding electrode in precision-welding relationship with said opposite side of said joint, producing a first weld from said opposite side having a predetermined penetration less than 100%, after said first weld has been produced as aforesaid, setting a second electrode in precision-welding relationship with said work, producing a second weld from said one side, said second weld penetrating to the root of said first weld, and in the producing of said second weld correcting for any deformations in the joint produced by said first weld.

6. The method of producing a precision weld having substantially 100% penetration between work materials of generally tubular form abutting at a joint, one side of said joint, external to said work materials, being visible to the welding operator and the opposite side of said joint, internal of said work materials, being invisible to said operator, the said weld being produced by arc welding with first arc welding apparatus, having an arc welding electrode for producing an internal weld and second arc welding apparatus, having an electrode, for producing an external weld, the said method comprising, with the aid of an indicator setting said electrode of said first apparatus in precision-welding relationship with said opposite side of said joint, producing a first weld from said opposite side having a predetermined penetration less than 100%, after said first weld has been produced as aforesaid setting said electrode of said second apparatus in precision-welding relationship with said one side of said joint, and producing a second weld from said one side which penetrates to the root of said first weld, the parameters of said second weld being set so as to correct for the distortions produced by said first weld.

7. Apparatus for arc welding a joint between abutting members from a side of said members from which said joint is not visible the said apparatus including a welding electrode and means mounting said electrode adjacent said joint on said side, the said apparatus being characterized by an electrical circuit including an indicator and said electrode and actuable by current flow through said circuit when said circuit is closed, said circuit being closed through said electrode and at least one of said members when said electrode is in contact with said one member adjacent said joint, and being open when said electrode is at said joint, said indicator indicating that said circuit is closed or open.

8. Apparatus for producing a weld internally at a circular joint between abutting parts, comprising a spindle housing supported on a mandrel engaging at least one of said parts, means rotating said housing relative to said mandrel about an axis substantially coincident with the axis of said tubes, a spindle supported by said housing rotatably in a circular path with said housing and extending into said one part generally parallel to the axis of said joint, an electrode mounted on said spindle, said spindle being set with said electrode opposite said joint, and means connected to said spindle and housing for moving said spindle relative to said housing generally perpendicularly to said axis to set said electrode a predetermined distance from said joint to set the arc length of an arc to be produced in the welding of said joint.

9. Apparatus for producing a weld internally at a circular joint between abutting parts, comprising a spindle extending into said parts generally parallel to the axis of said joint, said spindle including hollow tubes bent into the shape generally of a hairpin, an electrode of linear shape mounted on said spindle, substantially at the apex of said hairpin and in heat-exchange relationship with said apex, and extending generally radially from said spindle, said spindle being set with said electrode opposite said joint, means connected to the hollow tube of said spindle for transmitting a cooling fluid through said hairpin to and from said electrode, and means connected to said spindle to move said spindle including said hairpin in a circular path while said spindle is maintained generally parallel to said axis.

References Cited by the Examiner

UNITED STATES PATENTS

| | | | |
|---|---|---|---|
| 1,589,017 | 6/1926 | Lincoln | 219—137 |
| 1,811,121 | 6/1931 | Gastel | 33—24 |
| 1,869,351 | 7/1932 | Lincoln | 219—60 |
| 1,975,997 | 10/1934 | Whitesell | 219—109 X |
| 2,027,224 | 1/1936 | David | 219—135 |
| 2,066,569 | 1/1937 | Kinkead | 219—137 X |
| 2,093,821 | 9/1937 | Southgate | 219—75 X |
| 2,256,120 | 9/1941 | Lovenston | 340—282 |
| 2,542,393 | 2/1951 | Chapman | 219—8.5 |
| 2,667,559 | 1/1954 | Arnold | 219—137 |
| 2,716,691 | 8/1955 | Bowman | 219—61 |
| 2,792,490 | 5/1957 | Risch et al. | 219—137 |
| 2,819,517 | 1/1958 | Pursell | 219—137 X |
| 2,868,953 | 1/1959 | Gardner | 219—125 |
| 3,125,670 | 3/1964 | Hawthorne | 219—125 |
| 3,159,734 | 12/1964 | Cooksey et al. | 219—125 |

RICHARD M. WOOD, *Primary Examiner.*
JOSEPH V. TRUHE, *Examiner.*